United States Patent [19]

Brocheton et al.

[11] Patent Number: 5,525,553

[45] Date of Patent: Jun. 11, 1996

[54] COLORLESS OPHTHALMIC GLASSES

[76] Inventors: Yves Brocheton, 41, rue Gabriel Lacassagne, 94120 Fontenay sous Bois; Michel Prassas, 16 Rue Saint-Eloi, 77870 Vulaines S/Seine; Daniel L. G. Ricoult, 35 rue Lamartine, 91120 Palaiseau, all of France

[21] Appl. No.: 465,204

[22] Filed: Jun. 5, 1995

[30] Foreign Application Priority Data

Dec. 27, 1994 [FR] France .................. 94 15703

[51] Int. Cl.$^6$ .............. C03C 3/095; C03C 3/093; C03C 4/00
[52] U.S. Cl. .............. 501/64; 501/56; 501/59; 501/70; 501/903; 501/67
[58] Field of Search ............... 501/64, 56, 59, 501/70, 903, 67

[56] References Cited

U.S. PATENT DOCUMENTS

| | | | |
|---|---|---|---|
| 2,657,146 | 10/1953 | Kreidl | 501/64 |
| 3,951,671 | 4/1976 | Parry et al. | 501/67 |
| 3,954,487 | 5/1976 | Gliemeroth et al. | 501/67 |
| 4,012,131 | 4/1977 | Krohn et al. | 501/67 |
| 4,036,623 | 7/1977 | Deeg et al. | 501/64 |
| 4,257,811 | 3/1981 | Jahn | 106/47 |
| 4,565,791 | 1/1986 | Boutdot et al. | 501/56 |
| 4,719,186 | 1/1988 | Mennemann et al. | 501/67 |
| 4,746,634 | 5/1988 | Danielson | 501/67 |
| 5,017,521 | 5/1991 | Yale et al. | 501/64 |
| 5,219,801 | 6/1993 | Shorrock et al. | 501/65 |
| 5,300,467 | 4/1994 | Ishizaki et al. | 501/67 |
| 5,320,985 | 6/1994 | Enomoto | 501/57 |
| 5,320,987 | 6/1994 | Senoo et al. | 501/72 |
| 5,434,111 | 7/1995 | Clement et al. | 501/63 |

Primary Examiner—Mark L. Bell
Assistant Examiner—Louis M. Troilo
Attorney, Agent, or Firm—Angela N. Nwaneri

[57] ABSTRACT

This invention is directed to the production of glasses useful for ophthalmic applications which exhibit excellent resistance to the development of coloration upon being exposed to x-radiation and excellent resistance to the development of solarization. The glass compositions are essentially free of lead and consist essentially, in weight percent, of

| | | | | | |
|---|---|---|---|---|---|
| $SiO_2$ | 60–70 | $ZrO_2$ | 0.5–2 | $TiO_2$ | 0–1.5 |
| $B_2O_3$ | 0.5–5 | $CeO_2$ | 0.1–0.3 | $Sb_2O_3$ | 0–0.5 |
| $Al_2O_3$ | 2–6 | $Li_2O$ | 0–2 | $SO_3$ | 0–0.3 |
| $Na_2O$ | 9–14 | MgO | 0–5 | Br | 0–0.5 |
| $K_2O$ | 3–10 | SrO | 0–5 | Cl | 0–0.5 |
| CaO | 0.5–4 | BaO | 0–5 | F | 0–0.5. |
| ZnO | 3–9 | | | | |

8 Claims, No Drawings

COLORLESS OPHTHALMIC GLASSES

BACKGROUND OF THE INVENTION

This invention is directed to glass compositions for ophthalmic applications which, in addition to exhibiting low absorption of radiation in the visible region of the spectrum (i.e., the essential absence of coloration), demonstrate an improved color stability when lenses prepared therefrom have anti-reflective coatings applied thereupon.

When anti-reflective coatings are applied to certain commercially available glass using glow discharge equipment, an objectionable brown coloration tends to develop in the glass. During the process of producing an anti-reflective layer, glass, in the form of a corrective lens, is generally subjected to a discharge of a radiation of a short wavelength which induces an undesirable brown coloring. As a result, many commercially available glasses suffer from color instability when an anti-reflective layer is applied.

There are many examples of commercially available ophthalmic glass compositions. For example, U.S. Pat. No. 2,068,801 (Armistead) discloses the production of borosilicate glasses containing not less than 5% $B_2O_3$, not more than 10% alkali metal oxide, not less than 2% $CeO_2$, and not less than 7% BaO and/or ZnO, each component being present in weight percent. $Al_2O_3$ in an amount of 5% is cited in one of the working examples.

U.S. Pat. No. 2,657,146 (Kreidl) claims borosilicate glasses resistant to coloration caused by exposure to high energy sources consisting, in weight percent, of 60–70 $SiO_2$, 10–15 $Na_2O$, 0–2 SrO, 10–20 $B_2O_3$, 0.2–2 $CeO_2$, 0–2 BaO, 1–5 ZnO, and 0–2 $Al_2O_3$.

U.S. Pat. No. 3,951,671 (Parry et al.) describes borosilicate glasses for ophthalmic applications comprising, in weight percent, of 68–75 $SiO_2$, 16–22 $Na_2O$, 0.05–0.5 ZnO, 4.5–8 $Al_2O_3$, 0.5–2.8 $CeO_2$, 0.05–0.8 SrO, and 0–4 $B_2O_3$.

U.S. Pat. No. 4,565,791 (Boudot et al.) is directed to ophthalmic glasses exhibiting a cutoff of ultraviolet radiation at 2 mm thickness between 310–335 nm consisting essentially, in weight percent, of 49–71 $SiO_2$, 5–26 $B_2O_3$, 1.8–6 $TiO_2$, 0–14 $Al_2O_3$, 0–5.5 $ZrO_2$, 0–4 $Li_2O$, 0–16 $Na_2O$, 0–20 $K_2O$, 8–20 $Li_2O+Na_2O+k_2O$, 0–0.7 $As_2O_3$ and/or $Sb_2O_3$, 0–1 Cl and/or Br, 0–4 and/or MgO and/or BaO and/or ZnO.

U.S. Pat. No. 5,017,521 (Yale et al.) is drawn to glasses designed for covers for solar cells, the glass compositions comprising, in weight percent, of 60–78 $SiO_2$, 0.5–3 $Al_2O_3$, 10–25 $B_2O_3$, 0–2 $ZrO_2$, 3.5–6 $Li_2O$ and/or $Na_2O$ and/or $K_2O$, $\leq 3$ $Al_2O_3+ZrO$, 2–6.5 $CeO_2$, 0–2 $TiO_2$, 0.25–8 $As_2O_3$ and/or $Sb_2O_3$, 0–5 MgO and/or CeO and/or SrO and/or BaO, and 0–5 PbO.

U.S. Pat. No. 5,219,801 (Shorrock et al.) presents glasses utilized as protective covers for solar cells, the glass compositions consisting essentially, in mole percent, of 57–77 $SiO_2$, 7.6–10.6 $Li_2O+Na_2O+K_2O$, 0–8.5 $Al_2O_3$, 0.7–2 $CeO_2$, 4.6–23 $B_2O_3$, 0–0.3 $Sb_2O_3$,81–91 $SiO_2+Al_2O_3+B_2O_3$, 0–0.03 $As_2O_3$, 0–1.5 $Li_2O$, 0–2 $CeO_2$, 2–7.5 $Na_2O$, 0–2 $F_2$, 0–7 MgO and/or CaO and/or SrO and/or BaO and/or PbO.

There is also available, a commercially available ophthalmic glass which exhibits the following properties:

(a) a refractive index of 1.523;

(b) an Abbe number between 55–62;

(c) a density of 2.60 grams/cm³;

(d) a linear coefficient of thermal expansion over the temperature range of 0°–300° C. of $93\times10^{-7}$/°C.;

(e) a softening point of 710° C.;

(f) a transmission of radiation at a wavelength of 400 nm through a glass thickness of 2 mm of 90.5%; and (g) a cutoff of ultraviolet radiation, defined as the wavelength at which the transmission thereof is equal to 1% for a thickness of 2 mm, at a wavelength of 328 nm.

The above glass shows a sensitivity to the treatment used to apply an anti-reflective coating in a glow-discharge equipment; namely, the occurrence of an undesirable brown coloration.

Because such glass may be used as the major portion of a multifocal ophthalmic lens which will be fused to particular existing commercial segments, it is critical that the ophthalmic glass maintains its coefficient of thermal expansion, as well as its softening point within their respective ranges.

SUMMARY OF THE INVENTION

The fundamental objective of the present invention is to develop glass compositions which would eliminate the problem of coloration when anti-reflective coatings are applied to such glass using glow discharge equipment. Such glass must exhibit the following properties:

(1) a refractive index of 1.523±0.005;

(2) an Abbe number between 55–62;

(3) a density less than 2.7 grams/cm³;

(4) a linear coefficient of thermal expansion over the temperature range of 0°–300° C. between $88-95\times10^{-7}$/°C.;

(5) a softening point between 680°–730° C.;

(6) a transmission of radiation at a wavelength of 400 nm through a glass thickness of 2 mm greater than 85%;

(7) a cutoff of ultraviolet radiation, i.e., a transmission equal to 1% at a thickness of 2 mm, between 310–335 nm;

(8) resistance to the development of coloration upon being exposed to the glow discharge occurring in common anti-reflective coating equipment; and, most preferably, (9) resistance to the development of solarization.

We have found that glasses exhibiting the above properties can be produced from compositions consisting essentially, expressed in terms of weight percent on the oxide basis (except for the halogen components which are reported in terms of halides in accordance with conventional glass analysis practice), of

| $SiO_2$ | 60–70 | $ZrO_2$ | 0.5–2 | $TiO_2$ | 0–1.5 | |
|---|---|---|---|---|---|---|
| $B_2O_3$ | 0–5 | $CeO_2$ | 0.1–0.3 | $Sb_2O_3$ | 0–0.5 | |
| $Al_2O_3$ | 2–6 | $Li_2O$ | 0–2 | $SO_3$ | 0–0.3 | |
| $Na_2O$ | 9–14 | MgO | 0–5 | Br | 0–0.5 | |
| $K_2O$ | 3–10 | SrO | 0–5 | Cl | 0–0.5 | |
| CaO | 0.5–4 | BaO | 0–5 | F | 0–0.5 | |
| ZnO | 3–9 | $Li_2O +$ | 6–22 | MgO + | 0–7 | and |
| $Sb_2O_3$ + | <1. | $Na_2O$ + | | SrO + | | |
| $SO_3$ + | | $K_2O$ | | BaO | | |
| Br + Cl | | | | | | |

As used herein, the phrases "essentially free of lead" and "essentially free of antimony oxide" mean that the glass does not contain sufficient lead or antimony oxide (as the case may be) to alter the chemical and/or physical characteristics of the glass. Most desirably, lead and antimony oxide will be absent altogether, but this is not always possible and they may be present as impurities.

DETAILED DESCRIPTION OF THE INVENTION

Table I records several glass compositions, expressed in terms of pans by weight on the oxide basis (except for the halogen components), which are illustrative of the present inventive glasses. Because it is not known with which cation(s) the halogens are combined, they are recited in terms of halides as explained above. Inasmuch as the sum of the constituents closely approximates 100, for all practical purposes the individual value of each constituent may be deemed to represent weight percent. The actual batch ingredients for the glasses can comprise any materials, either oxides or other components, which, when melted together, will be converted into the desired oxide in the proper proportions. For example, borax may constitute a source of $Na_2O$ and $B_2O_3$, NaBr a source of $Na_2O$ and Br, and $CaCO_3$ may provide the source of CaO.

The expansion coefficient and the softening point of the inventive glass make it possible to use such glass as a major component of a bifocal lens since such glass can be easily welded to a segment of commercial glass having a high refraction index.

While the optimum amounts of the various components of the inventive glass composition may vary depending on process conditions, the following is a general guideline for determining the appropriate amounts of the various components.

Above 70% $SiO_2$, the glass would be difficult to melt and to fine with conventional techniques of the glass industry. Below 60% $SiO_2$, it would be difficult to obtain the targeted optical and physical characteristics, as well as good chemical resistance.

Boron oxide does not significantly affect the optical performance of the glass, but its possible presence makes it possible to improve the meltability of the glass. It will, however, be kept to a content of less than 5%, in order not to degrade the chemical durability of the glass.

At least 1% alumina is needed to confer good chemical durability to the glass. $Al_2O_3$ also increases the ultraviolet cutoff when it replaces silica. Above 6%, this oxide, however, causes problems in melting the glass.

Alkaline metal oxides are added as a flux to promote melting of the ingredients used to make up the glass. Furthermore, they can be made to vary within the indicated ranges to adjust simultaneously the expansion coefficient of the glass between 88 and 95 $\times 10^{-7}$/°C. and the softening point of the glass, in order to retain the possibility of welding the conventional segments to the glass of the invention with a view to manufacturing bifocal corrective lenses. Types of glass containing concentrations of $Na_2O$, $K_2O$ and $Li_2O$ beyond the limits indicated in the invention would not possess sufficient characteristics of chemical durability. For the same reason, the sum of the alkaline metal oxides will be kept between 6 and 20%.

In particular, $Li_2O$ is an effective flux, but, because of its cost and its tendency to promote the opacification of the glass, it should be kept below 2%.

At least 3% zinc oxide is needed in the compositions of the invention to improve the ability to undergo chemical tempering. Because of the increase in density which results from its use and its cost, it will be kept to a content of less than 9%.

The glass index is essentially adjusted with the aid of zirconium, titanium, barium, strontium and calcium oxides in the above-mentioned composition ranges.

The level of calcium oxide must be above 0.5% to adjust the index of refraction of the glass and to make it possible to obtain a high viscosity slope at intermediate viscosities, particularly around $10^{7.6}$ Pa.sec, the softening point of the glass. This viscosity range is particularly critical to the present invention, inasmuch as it will contribute to the weldability of the glass with the existing commercial segments. Its concentration will be preferably below 4% in order not to damage the chemical durability of the glass.

The oxides of magnesium, barium and strontium may also be present in the compositions of the invention in individual contents that do not exceed 5%, while their sum does not exceed 7%. These oxides are used to contribute to the reduction of the high-temperature viscosity of the glass, to adjust the viscosity slope in the range approaching the softening point and to correct the index of refraction.

Zirconium oxide is necessary in the types of glass of the invention with a content at least equal to 0.5%, inasmuch as it bestows upon them good chemical durability and it contributes, in a way similar to zinc oxide, to improving their chemical temperability. It, furthermore, is effectively involved in the increase of the index of refraction and may likewise be used to minimize the expansion coefficient. Its contribution is, however, limited to 2%, in order not to induce problems in melting the glass.

Cerium oxide serves to absorb ultraviolet radiation. To obtain an ultraviolet cutoff between 310 and 335 nm, it has been found that 0.1–0.3 wt % cerium oxide is needed.

Titanium oxide may be included in the composition of the types of glass of the invention to complement the effect of the cerium oxide as an ultraviolet absorber, but also to contribute to the adjustment of the index of refraction. Its maximum content must not exceed 1.5%, because above that level its sensitivity to the interactions with any impurities present in the vitrifiable mixture increases, and an undesirable yellow coloring of the glass results from it because of this fact.

The glass is fired with the help of $SO_3$, Br, Cl and F in the contents given above. These components should be used individually at concentrations that do not exceed the indicated higher limits in order to minimize the risks of corroding the glass-forming tools. Furthermore, for the same reason, the sum of the firing agents shall not exceed 1%.

The glass compositions of the invention may be prepared starting with vitrifiable mixtures of appropriate conventional raw materials used in the glass industry. For example, borax may constitute the source of the boron and sodium oxides, sodium bromide, that of the $Na_2O$ and bromine, and calcium carbonate, that of the necessary calcium oxide. The halogens, arsenic or antimony are added as conventional firing agents.

In preparing glass samples 1 and 2 in Table 1, the raw materials were weighed, compounded and mixed thoroughly (blended) so as to ensure the homogeneity of the resulting glass melt. The mixture was then charged into a platinum crucible, and placed in a furnace for melting. In order to limit the dissipation of volatile elements from the mixture, a lid was placed over the crucible. The covered crucible was moved into a furnace operating at a temperature of about 1500° C. After melting, the batch was maintained at this temperature for about three hours with stirring. The melted glass was poured into steel molds to form glass slabs or bars having dimensions of about 3×7×30 cm. These bars were then transferred to a furnace and reheated (annealed) at 540° C.

The above description reflects an experimental laboratory procedure only. Thus, the inventive glass compositions are capable of being melted and formed utilizing large scale, commercial glass melting and forming equipment and techniques.

In order to simulate in the laboratory, the radiation discharge or glow that occurs during anti-reflective treatment of a corrective lens, samples of glass Samples 1 and 2, were polished and exposed for 15 minutes to X-rays emitted by an X-ray fluorescent apparatus functioning at 60 kilovolts (kV) and 40 microamperes (μA). A qualitative visual examination of the color of the glass was then made. To evaluate the resistance of the glass to solarization, samples of the glass having a thickness of 2 mm were exposed for 48 hours to ultraviolet radiation emitted by a lamp the emission spectrum of which simulates solar rays. The sensitivity of the glass to the solarization was then monitored by measuring the development of the transmittance at 400 nm before and after exposure. For the purpose of this experiment, the extent of solarization was quantified as the difference at a wavelength of 400 nm between the initial transmittance of the glass and the transmittance after irradiation from the solar simulating lamp, that difference being expressed in terms of percent.

Table I compares three glass compositions. Sample A (a commercial lead-containing glass), Sample 1 (lead-containing glass), and Sample 2 (a lead-free glass composition of the invention). Table I compares the color exhibited by each glass prior to exposure to x-radiation and ultraviolet radiation (Color $T_o$), the color exhibited after exposure to x-radiation (Color $T_x$), and the loss of transmittance due to solarization (Solar) experienced by each glass. The lead-containing glass compositions both exhibited a yellow tint after exposure.

As shown in Table 1, the presence of lead in the glass compositions results in the development of a yellow tint upon exposure to X-radiation. Thus, the composition must be essentially free of lead. Most desirably, lead will be absent altogether, but this is not always possible and it may be present as an impurity.

It is also clear from Table I that, in the absence of lead, the presence of the $CeO_2/Sb_2O_3$ pair results in a strong tendency to solarization. Therefore, inasmuch as $CeO_2$ is necessary to assure the required cutoff of ultraviolet radiation, it is preferred that the inventive glasses be essentially free of $Sb_2O_3$.

TABLE 1

|  | A | 1 | 2 |
| --- | --- | --- | --- |
| $SiO_2$ | 64.26 | 64.26 | 64.26 |
| $B_2O_3$ | 2.0 | 2.0 | 2.0 |
| $Al_2O_3$ | 4.33 | 4.33 | 4.33 |
| $ZrO_2$ | 0.75 | 0.75 | 0.75 |
| $Na_2O$ | 10.595 | 10.595 | 10.595 |
| $K_2O$ | 6.4 | 6.4 | 6.4 |
| CaO | 1.15 | 1.15 | 1.15 |
| SrO | — | 1.5 | 3.0 |
| ZnO | 6.45 | 6.45 | 6.45 |
| PbO | 3.0 | 1.5 | - - |
| $TiO_2$ | 0.2 | 0.2 | 0.2 |
| $CeO_2$ | 0.18 | 0.18 | 0.18 |
| $Sb_2O_3$ | 0.4 | 0.4 | 0.4 |
| Br | 0.25 | 0.25 | 0.25 |
| $SO_3$ | 0.035 | 0.035 | 0.035 |
| Color $T_o$ | Colorless | Colorless | Colorless |
| Color $T_x$ | Dark Yellow | Yellowish | Colorless |
| Solar | 1.4 | 2.4 | 4.1 |

In the following experiments we confirm the need to remove lead from the glass compositions and the advantage to be gained vis-a-vis the generation of solarization by the elimination of antimony from the glass.

In Table II, we compare four inventive glass compositions (Samples 3–6) prepared according to the above inventive method, against commercial lead-containing glass (Sample A). Again, the glass compositions are expressed in terms of parts by weight on the oxide basis (except for the halogen content), further illustrating the present inventive glasses. Glass slabs were prepared from those compositions in like manner to those described above.

Table 2 also lists the refractive index ($n_D$), the Abbe number (Abbe), the density (Dens.), expressed in terms of grams/$cm^3$, the linear coefficient of thermal expansion (Exp.) over the temperature range of 20°–300° C., expressed in terms of $\times 10^{-7}$/°C., the softening point (S.P.), expressed in terms of °C., the transmittance of the glass in 2 mm thickness at a wavelength of 400 nm ($T_{400}$), expressed in terms of percent, the wavelength of the ultraviolet cutoff (Cutoff), expressed in terms of nm, the loss of transmittance due to solarization (Solar), expressed in terms of percent, and the color exhibited by the glass after exposure to X-radiation (Color $T_x$).

TABLE 2

|  | A | 3 | 4 | 5 | 6 |
| --- | --- | --- | --- | --- | --- |
| $SiO_2$ | 64.26 | 63.05 | 64.75 | 64.45 | 63.44 |
| $B_2O_3$ | 2.0 | 2.0 | 3.0 | 2.0 | 1.0 |
| $Al_2O_3$ | 4.33 | 4.32 | 4.32 | 3.32 | 4.33 |
| $ZrO_2$ | 0.75 | 0.75 | 0.75 | 0.75 | 1.75 |
| $Li_2O$ | - - | - - | 0.8 | - - | - - |
| $Na_2O$ | 10.595 | 10.6 | 10.1 | 10.6 | 12.0 |
| $K_2O$ | 6.4 | 6.4 | 4.8 | 6.4 | 8.0 |
| CaO | 1.15 | 2.55 | 1.15 | 1.15 | 2.0 |
| BaO | - - | 3.0 | 3.0 | 3.0 | - - |
| ZnO | 6.45 | 6.45 | 6.45 | 6.45 | 6.85 |
| PbO | 3.0 | — | - - | - - | - - |
| $TiO_2$ | 0.2 | 0.2 | 0.2 | 0.2 | 0.2 |
| $CeO_2$ | 0.18 | 0.18 | 0.18 | 0.18 | 0.18 |
| $Sb_2O_3$ | 0.4 | - - | - - | - - | - - |
| Br | 0.25 | 0.25 | - - | 0.5 | 0.25 |
| F | - - | 0.25 | 0.5 | - - | - - |
| $SO_3$ | 0.035 | — | - - | - - | - - |
| $n_D$ | 1.523 | ? | 1.521 | 1.520 | 1.522 |
| Abbe | 57.6 | 58.6 | 59.6 | 58.8 | 57.7 |
| Dens. | 2.60 | 2.60 | - - | 2.59 | 2.58 |
| Exp. | 93 | 92 | - - | - - | — |
| S.P. | 710 | 705 | ? | 718 | 709 |
| $T_{400}$ | 90.5 | 90.7 | 91.2 | 90.9 | 90.0 |
| Cutoff | 328 | 328 | 321 | 329 | 328 |
| Solar | 1.5 | 1.4 | - - | 1.5 | — |
| Color $T_x$ | Yellow | Colorless | Colorless | Colorless | Colorless |

Based upon the most desirable combination of chemical, mechanical, and physical properties, the preferred glass compositions are essentially free of lead and antimony, and consist essentially, in weight percent on the oxide basis (except for the halogen content), of

| $SiO_2$ | 61–66 | ZnO | 5–7 | BaO | 0–3 |
| --- | --- | --- | --- | --- | --- |
| $B_2O_3$ | 1–5 | $ZrO_2$ | 0.5–2 | $TiO_2$ | 0–1 |
| $Al_2O_3$ | 2–5 | $CeO_2$ | 0.1–0.3 | $SO_3$ | 0–0.2 |
| $Na_2O$ | 9–13 | $Li_2O$ | 0–1 | Br | 0.2–0.5 |
| $K_2O$ | 4–9 | MgO | 0–1 | Cl | 0–0.5 |
| CaO | 1–4 | SrO | 0–3 | F | 0–0.5 |
| $Li_2O + Na_2O + K_2O$ 13–22, and $SO_3 + Br + Cl < 1$. | | | | | |

The most especially preferred glass is that of Example 3 of Table II.

We claim:

1. Corrective lenses, characterized by being essentially free of lead and consisting essentially, expressed in terms of weight percent on the basis of the oxides, of:

| $SiO_2$ | 60–70 | $ZrO_2$ | 0.5–2 | $CeO_2$ | 0.1–0.3 |
|---|---|---|---|---|---|
| $Al_2O_3$ | 2–6 | $Na_2O$ | 9–14 | $K_2O$ | 3–10 |
| CaO | 0.5–4 | ZnO | 3–9 | | | and exhibiting the following properties:
 (a) a refractive index of 1.523±0.005;
 (b) an Abbe number between 55–62;
 (c) a density less than 2.7 grams/cm$^3$;
 (d) a linear coefficient of thermal expansion over the temperature range of 0°–300° C. between 88–95× $10^{-7}$/°C.;
 (e) a softening point between 680°–730° C.;
 (f) a transmission of radiation at a wavelength of 400 nm through a glass thickness of 2 mm greater than 85%;
 (g) a cutoff of ultraviolet radiation between 310–335 nm;
 (h) resistance to the development of coloration upon being exposed to x-radiation; and
 (i) resistance to the development of solarization.

2. Corrective lenses according to claim 1, further comprising, expressed in terms of weight percent on the basis of the oxides, of:

| $TiO_2$ | 0–1.5 | $B_2O_3$ | 0–5 | $Sb_2O_3$ | 0–0.5 |
|---|---|---|---|---|---|
| $Li_2O$ | 0–2 | $SO_3$ | 0–0.3 | MgO | 0–5 |
| Br | 0–0.5 | SrO | 0–5 | Cl | 0–0.5 |
| BaO | 0–5 | F | 0–0.5 and | | |
| $Li_2O + Na_2O + K_2O$ | 6–22 | | | | |
| MgO + SrO + BaO | 0–7 and | | | | |
| $Sb_2O_3 + SO_3 + Br + Cl$ | <1. | | | | |

3. Corrective lenses according to claim 1, characterized by being essentially free of lead and antimony and consisting essentially, expressed in terms of weight percent on the basis of the oxides, of:

| $SiO_2$ | 61–66 | ZnO | 5–7 | $B_2O_3$ | 1–5 |
|---|---|---|---|---|---|
| $ZrO_2$ | 0.5–2 | $Al_2O_3$ | 2–5 | $CeO_2$ | 0.1–0.3 |
| $Na_2O$ | 9–13 | Br | 0.2–0.5 | $K_2O$ | 4–9 |
| CaO | 1–4. | | | | |

4. Corrective lenses according to claim 3, further comprising, expressed in terms of weight percent on the basis of the oxides, of:

| BaO | 0–3 | $TiO_2$ | 0–1 | $SO_3$ | 0–0.2 |
|---|---|---|---|---|---|
| $Li_2O$ | 0–1 | MgO | 0–1 | Cl | 0–0.5 |
| SrO | 0–3 | F | 0–0.5 | | |
| $Li_2O + Na_2O + K_2O$ | 13–22 and | | | | |
| MgO + SrO + BaO | 0–7. | | | | |

5. A glass for ophthalmic applications exhibiting the following properties:
 (a) a refractive index of 1.523±0.005;
 (b) an Abbe number between 55–62;
 (c) a density less than 2.7 grams/cm$^3$;
 (d) a linear coefficient of thermal expansion over the temperature range of 0°–300° C. between 88–95× $10^{-7}$/°C.;
 (e) a softening point between 680°–730° C.;
 (f) a transmission of radiation at a wavelength of 400 nm through a glass thickness of 2 mm greater than 85%;
 (g) a cutoff of ultraviolet radiation between 310–335 nm;
 (h) resistance to the development of coloration upon being exposed to x-radiation; and
 (i) resistance to the development of solarization;
said glass being characterized in being essentially free of lead and consisting essentially, expressed in terms of weight percent, of

| $SiO_2$ | 60–70 | $B_2O_3$ | 0.5–5 | $ZrO_2$ | 0.5–2 |
|---|---|---|---|---|---|
| $CeO_2$ | 0.1–0.3 | $Al_2O_3$ | 2–6 | $Na_2O$ | 9–14 |
| $K_2O$ | 3–10 | CaO | 0.5–4 | ZnO | 3–9. |

6. A glass according to claim 5, further comprising, expressed in terms of weight percent on the basis of the oxides, of:

| $TiO_2$ | 0–1.5 | $B_2O_3$ | 0–5 | $Sb_2O_3$ | 0–0.5 |
|---|---|---|---|---|---|
| $Li_2O$ | 0–2 | $SO_3$ | 0–0.3 | MgO | 0–2 |
| Br | 0–0.5 | SrO | 0–5 | Cl | 0–0.5 |
| BaO | 0–5 | F | 0–0.5 | | |
| $Li_2O + Na_2O + K_2O$ | 6–22 | | | | |
| MgO + SrO + BaO | 0–7 and | | | | |
| $Sb_2O_3 + SO_3 + Br + Cl$ | <1. | | | | |

7. A glass according to claim 5, characterized by being essentially free of lead and antimony and consisting essentially, expressed in terms of weight percent on the basis of the oxides, of:

| $SiO_2$ | 61–66 | ZnO | 5–7 | $B_2O_3$ | 1–5 |
|---|---|---|---|---|---|
| $ZrO_2$ | 0.5–2 | $Al_2O_3$ | 2–5 | $CeO_2$ | 0.1–0.3 |
| $Na_2O$ | 9–13 | Br | 0.2–0.5 | $K_2O$ | 4–9 |
| CaO | 1–4. | | | | |

8. A glass according to claim 7, further comprising, expressed in terms of weight percent on the basis of the oxides, of:

| BaO | 0–3 | $TiO_2$ | 0–1 | $SO_3$ | 0–0.2 |
|---|---|---|---|---|---|
| $Li_2O$ | 0–1 | MgO | 0–1 | Cl | 0–0.5 |
| SrO | 0–3 | F | 0–0.5 | | |
| $Li_2O + Na_2O + K_2O$ | 13–22 and | | | | |
| MgO + SrO + BaO | 0–7. | | | | |

* * * * *

UNITED STATES PATENT AND TRADEMARK OFFICE
CERTIFICATE OF CORRECTION

PATENT NO. : 5,525,553
DATED : 6/11/96
INVENTOR(S) : Yves Brocheton, Michel Prassas, Daniel L.G. Ricoult It is certified that error appears in the above-indentified patent and that said Letters Patent is hereby corrected as shown below:

Column 1, line 44, "8-20 $Li_2O$+ NaO+$k_2O$" should read --8-20 $Li_2O$+$Na_2O$+$K_2O$--.

Column 1, line 59, "$B_2O_3$, 0-0.03 $As_2O_3$" should read --$B_2O_3$, 0-0.3 $As_2O_3$--.

Column 1, line 59, "0-2 $CeO_2$" should read --0-2 $TiO_2$--.

Column 3, line 8, "terms of pans" should read --in terms of parts--.

Signed and Sealed this

First Day of June, 1999

Attest:

Attesting Officer

Q. TODD DICKINSON

Acting Commissioner of Patents and Trademarks